Figure 1:
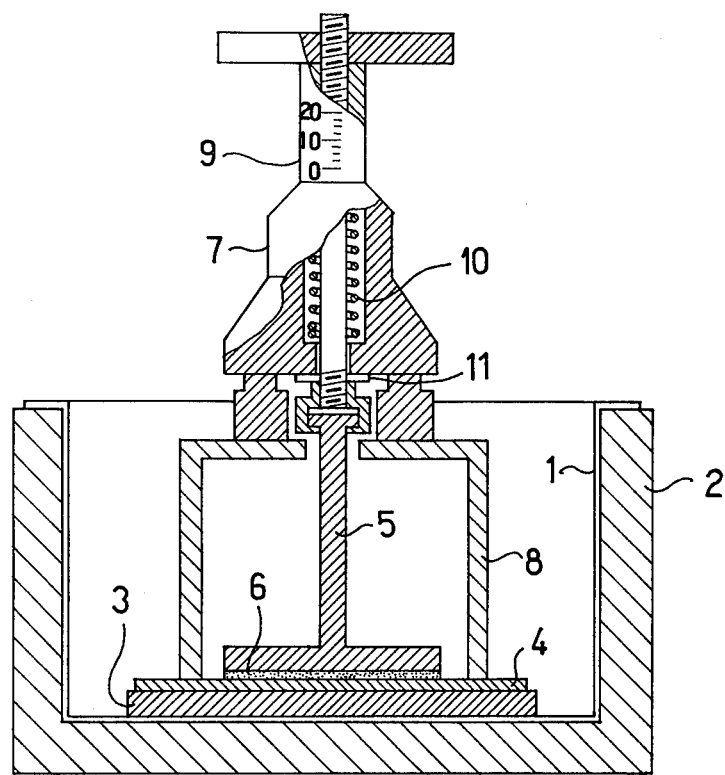

United States Patent [19]

Murase

[11] 4,448,919

[45] May 15, 1984

[54] ANTI-ICING COMPOSITIONS

[75] Inventor: Heihachi Murase, Kanagawa, Japan

[73] Assignee: Kansai Paint Company, Hyogo, Japan

[21] Appl. No.: 430,018

[22] Filed: Sep. 30, 1982

[51] Int. Cl.³ ............................................. C08L 83/04
[52] U.S. Cl. ..................... 524/394; 524/327;
524/396; 524/397; 524/401; 524/405; 524/406;
524/407; 524/408; 524/417; 524/418; 524/420;
524/421; 524/423; 524/424; 524/428; 524/429;
524/588
[58] Field of Search ............... 524/327, 396, 394, 588,
524/397, 405, 407, 417, 423, 424, 442, 406, 408,
401, 414, 418, 420, 421, 428, 429

[56] References Cited

U.S. PATENT DOCUMENTS 3,579,540  5/1971  Ohlhausen ........................ 524/414
3,928,489 12/1975  Berlin et al. ..................... 524/396
4,157,991  6/1979  Pilla .................................. 524/588

FOREIGN PATENT DOCUMENTS 538178  3/1957  Canada .............................. 524/327

OTHER PUBLICATIONS

The Condensed Chemical Dictionary; Reinhold Publishing Corp.; 7th Ed.; pp. 561–563.

*Primary Examiner*—Lewis T. Jacobs
*Attorney, Agent, or Firm*—Larson and Taylor

[57] ABSTRACT

A composition for use in preventing the formation of ice comprising:

(A) organopolysiloxane resin represented by the structural unit $$R_n Si(OR')_m O_{\frac{4-n-m}{2}}$$

wherein R represents hydrogen atom or monovalent organic group attached to the silicon atom by a carbon-to-silicon bond, R' represents hydrogen atom, $C_1$ to $C_{20}$ alkyl group, aryl group, oxime residue, n and m are each 0 or an integer of up to 4, and n plus m is 0 or an integer of less than 4, and (B) alkali metal compound represented by the formula $$M a \oplus X \ominus$$

wherein M represents alkali metal selected from Li, Na and K, X represents inorganic or organic acid group or hydroxyl group and a is an integer of 1 to 4.

3 Claims, 1 Drawing Figure

ANTI-ICING COMPOSITIONS

This invention relates to compositions for use in preventing the formation of ice onto the surface of an object exposed to icing conditions and particularly to organopolysiloxane resin-based compositions useful for prevention of icing.

Freezing of water is caused by the formation of hydrogen bonds of water molecules at low temperatures below 0° C., giving an extremely great cohesion. A theoretical strength for destruction of molecules united thereby is said to be 10,000 kg/cm$^2$ while a measured strength is 16 to 80 kg/cm$^2$. Ice is sticked to the surface of an object with an enormous adhesion due to the hydrogen bonds between the water and the surface thereof. Damages have been given by freezing and icing in cold climates and in winter seasons in various parts of the world. The reported hazards and damages include a variety of those such as hazards to sea and air travel by icing on vessels or aircraft, paralysis of train services by frozemn railways, interruption of traffic by frozen roads, accident hazards in such cases, and cutting of transmission lines, collapse or houses and troubles of transmitter-receivers, all by snowfall. Above all, the ice formed on ships is likely to cause a fatal accident because it is able to elevate the center of gravity to such level that the ship will capsize. Generally anti-freezing agents are sprayed over roads to keep the roads from freezing. For example, at least 10 million tons of such agents have been used yearly in the U.S., thereby causing over 100 million dollars damages resulting from the formation of rust on automobiles and pollution of underground water. In recent years, new oil wells have been increasingly drilled in the North Sea in view of exhaustion of oil resources. Now there are demands for anti-icing materials agents useful in the development of oil wells there so that investigation or research is actively being made to prepare effective anti-icing materials.

Heretofore attempts have been made to prevent the formation of ice by applying a coating composition to the surface of an object to form coatings having reduced susceptibility to icing. Known coating compositions as used for this purpose include those predominantly containing acrylic resin, rubber, fluorine-containing resin, silicone resin, etc. Among them, organopolysiloxane resin, namely a kind of silicone resin, has been frequently used. For example, Chemical Abstracts Vol. 93, 134009P discloses a silicone-type coating composition for prevention of icing intended to be applied in two layers. Further U.S. Pat. No. 4,271,215 teaches a coating composition for release of ice containing carboxy-functional siloxane and tetraalkoxy titanium compound.

The coatings formed from known coating compositions have more or less reduced susceptibility to icing, but fails to completely preclude ice from forming with high adhesion due to hydrogen bonds. Therefore further improvements are desired.

The main object of this invention is to provide anti-icing compositions predominantly containing organopolysiloxane resin and having remarkable anti-icing properties.

The other objects and other features of this invention will become more apparent from the following description.

FIG. 1 is a side elevation view, partially in section, showing the device used for testing the coating compositions for susceptibility to icing.

The object of this invention can be achieved by using as the anti-icing material a composition comprising:

(A) 70 to 99.8% by weight of organopolysiloxane resin comprising recurring structural units of the formula

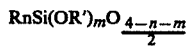

wherein R represents hydrogen atom or monovalent organic group attached to the silicon atom by a carbon-to-silicon bond, R' represents hydrogen atom, alkyl group having 1 to 20 carbon atoms, acyl group, aryl group or oxime residue, n and m are each 0, 1, 2, or 3, and n plus m is an integer of 1–3, and (B) 0.2 to 30% by weight of alkali metal compound represented by the formula

wherein M represents alkali metal selected from Li, Na and K, X represents inorganic or organic acid group or hydroxyl group and a is an integer of 1 to 4.

We made basic studies of the mechanism of icing, investigating the phenomenon of icing from view-points of three factors, namely surface-scientific, physical and thermodynamical factors and found that while organopolysiloxane resin is lower in susceptibility to icing than any other resin, any kind of organopolysiloxane resins when used singly results in the formation of coatings considerably amenable to icing. In the course of continued research, we discovered that icing can be almost completely prevented by the synergistic action resulting from the combined use of alkali metal compound and organopolysiloxane resin. This invention has been accomplished based on this novel finding.

It is presumed that the present composition is able to achieve complete prevention of icing by the composite actions of the two components, namely by the action due to interfacial and physical characteristics of the organopolysiloxane resin (A), combined with the thermodynamical action of the alkali metal compound (B).

The organopolysiloxane resin has a chain of hydrocarbon atoms arranged on its surface and thus is low in surface energy. Further, this resin contains a small amount of a polar ingredient prone to form hydrogen bonds. With such properties, the resin (A) is well known to find various applications as a material for forming a water-repellent surface. The ability of the resin (A) to reduce susceptibility to icing is derived largely from the physical characteristics of the resin in low temperatures in addition to the low surface energy thereof. The resin (A) is low in rigidity and has a low glass transition temperature. Thus even at extremely low temperatures, e.g. −30° C., the mobility of the resin molecules is not interrupted so that this factor, coupled with its low rigidity, results in less likelihood of the resin molecules being caught by water molecules to form hydrogen bonds.

The susceptibility of the coating to icing depends on the viscoelasticity of the coating in a low temperature zone as well as on the properties of the surface of the coating. Therefore, the amenability of the coating to icing varies with the thickness of the coating. For example, the adhesion between ice and the coating is 0.3 to 1.2 kg/cm² with a coating 50 to 200 μm in thickness at −25° C., whereas the adhesion therebetween is increased to 1.0 to 2.4 kg/cm² with a coating 5 to 10 μm in thickness at the same temperature. However, when for example 3 parts of alkali metal compound is added to 100 parts of the resin (A), the adhesion therebetween becomes naught even with a coating 5 to 10 μm in thickness.

This mechanism will be described below by referring to the use, by way of example, of lithium compound, a kind of alkali metal compound. The ion or Li⊕ is small in radius (0.6 Å) so that the hydration energy is as great as 125 kg cal g/Ion (that of Na is 94.6 kg cal g/Ion). Five water molecules are adsorbed on the ion of Li⊕ and 10 water molecules are adsorbed on the surface of the 5 water molecules. These water molecules do not contribute to the formation of hydrogen bonds because the molecules are positioned too near the lithium ion and are adsorbed by greater energy than hydrogen bonds. The lithium compound trapped in the matrix of the organopolysiloxane resin do not permit the water molecules adsorbed on the surface of the coating to become congealed, consequently allowing no formation of ice. Similar actions are achieved in the case of the Na⊕ ion and K⊕ ion but less effectively than with Li⊕ ion which is thus more adequate for use.

The organopolysiloxane resin (A) of this invention is represented by the following structural unit

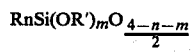

and can be dispersed and/or dissolved in water or an organic solvent, thereby taking a liquid form. R in this formula represents hydrogen atom or monovalent organic group attached to the silicon atom by a carbon-to-silicon bond.

Examples of organic groups are methyl, ethyl, propyl, hexyl, and like alkyl groups; cyclohexyl, cyclobutyl, cyclopentyl and like cycloalkyl groups; phenyl, tolyl, xylyl, naphthyl and like substituted or unsubstituted aryl groups; benzyl, phenylethyl, methylbenzyl, naphthylbenzyl and like aralkyl groups; vinyl, allyl, oleyl and like alkenyl groups; cyclopentadienyl, 2-cyclobutenyl and like cycloalkenyl groups; vinylphenyl and like alkenylaryl groups, etc. Among them, lower alkyl groups having 1 to 6 carbon atoms are most effective in preventing the formation of ice. Examples of substituents for the aryl group are methyl, ethyl and like alkyl groups, etc.

R' in the structural unit represents hydrogen atom and groups such as methyl, ethyl, propyl, butyl, amyl, hexyl, octyl and like alkyl groups having 1 to 20 carbon atoms; aryl groups; acetyl, propionyl, butyryl and like acyl groups having 1 to 8 carbon atoms; oxime rediues; etc. Examples of the aryl group are substituted or unsubstituted phenyl group and substituted or unsubstituted naphthyl group, etc. Examples of substituents for the aryl group are methyl, ethyl and like alkyl phenyl, tolyl, xylyl, naphthyl, etc. The organopolysiloxane resin is usable in this invention without limitation on the molecular weight insofar as it is dispersible and/or soluble in water and an organic solvent, as described above. Usually there are used those having a number average molecular weight of about 300 to about 1,000,000, preferably about 1,000 to about 500,000. It is preferred to use the organopolysiloxane resin having reactive groups such as hydroxyl group or alkoxy groups. Such organopolysiloxane resins include those available under Z-6018, Z-6188, Sylkyd 50 and DC-3037 (products of Dow Corning Corp., U.S.); KR-216, KR-218 and KS-1 (products of Shin-etsu Silicone K.K., Japan); TSR-160 and TSR-165 (products of Toshiba Corp., Japan); and SE 1821, SE 1980, SE 9140, SRX 211, PRX 305, SH 237 and SH 9551 RTV (products of Toray Silicone K.K., Japan), etc.

Typical curing mechanisms for organopolysiloxane resins are those of (I) condensation polymerization type and (II) addition polymerization type, as schematically illustrated below.

(I) Condensation polymerization type

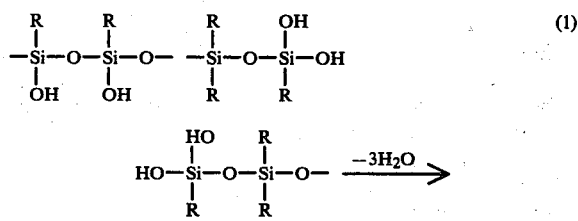

(1)

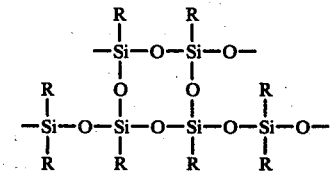

(2)

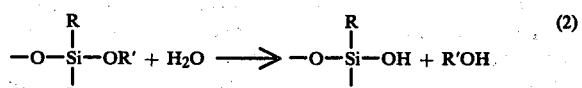

(3)

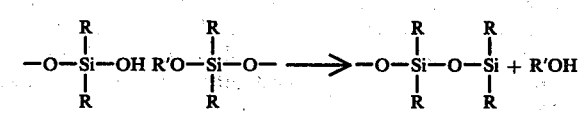

(4)

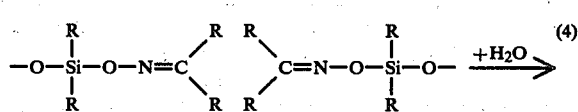

(II) Addition polymerization type

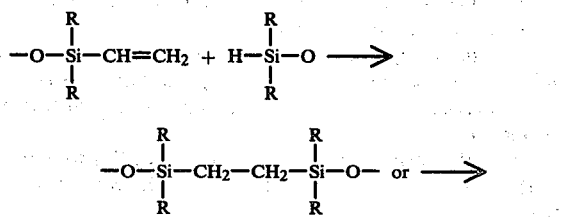

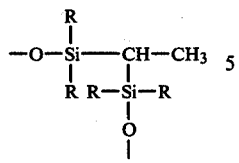
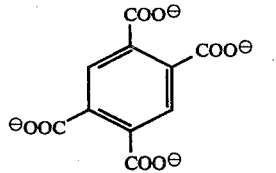

etc.

In the foregoing reaction equations, R and R' are as defined above.

The susceptibility of the coating to icing is markedly increased when the present composition contains the organopolysiloxane resin in an amount of more than 99.8% by weight or less than 70% by weight.

M in the formula MaX representing the alkali metal compound (B) is alkali metal selected from Li, Na and K among which Li is most suitable for use. X in the formula is an inorganic or organic acid group or hydroxyl group. The inorganic acid group means a portion which remains after removing at least one hydrogen atom substitutable with metal from the molecule of an inorganic acid group. The remaining portion includes single atom(s) such as $F^{\ominus}$, $Cl^{\ominus}$, $Br^{\ominus}$ and $I^{\ominus}$ and atomic group(s) such as $NO_3^{\ominus}$, $CO_3^{2\ominus}$, $PO_4^{3\ominus}$, $HP_4^{2\ominus}$, $SO_4^{2\oplus}$, $HSO_4^{\ominus}$, $MnO_4^{\ominus}$, $Cr_2O_7^{2\ominus}$, $SiO_4^{4\ominus}$, $SiO_3^{2\ominus}$, $BO_2^{\ominus}$, $VO_4^{3\ominus}$, $WO_4^{2\ominus}$, etc.

The organic acid group means a portion which remains after removing at least one of hydrogen atoms substitutable with metal from the molecule of a saturated or unsaturated monocarboxylic acid or polycarboxylic acid. Examples of such acid groups are saturated monocarboxylic acid groups of the formual $HCOO^{\ominus}$, or $CH_3(CH_2)_nCOO^{\ominus}$ wherein n is 0 or an integer of 1 to 20; saturated dicarboxylic acid group of the formula

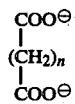

wherein n is 0 or an integer of 1 to 10; maleic acid, oleic acid, linoleic acid, and like unsaturated acid groups; and polycarboxylic acid groups such as tartaric acid group of the formula $^{\ominus}OOC\text{-}(CHOH)_2\text{---}COO^{\ominus}$, citric acid group of the formula

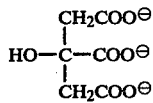

trimellitic acid group of the formula

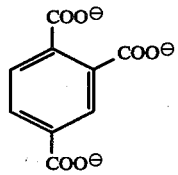

pyromellitic acid group of the formula

The value a of the formula varies with the kind of the organic or inorganic acid groups and is generally an integer of 1 to 4.

Examples of alkali metal compounds having the above formula are

LiF, LiCl, LiBr, LiI, NaF, NaCl, NaBr, NaI, KF, KCl, KBr, KI, $LiNO_3$, $NaNO_3$, $KNO_3$, $Li_2CO_3$, $Na_2CO_3$, $K_2NO_3$, $Li_3PO_4$, $Na_3PO_4$, $KPO_4$, $Li_2SO_4$, $Na_2SO_4$, $K_2SO_4$; $LiMnO_4$, $NaMnO_4$, $KMnO_4$, $Li_2Cr_2O_7$, $Na_2Cr_2O_7$, $K_2Cr_2O_7$, $Li_4SiO_4$, $Li_2SiO_3$, $Na_4SiO_4$, $Na_2SiO_3$, $K_4SiO_4$, $K_2SiO_3$, $LiBO_2$, $NaBO_2$, $KBO_2$, $Li_3VO_4$, $K_3VO_4$, $Li_2WO_4$, $Na_2WO_4$, $K_2WO_4$; HCOOLi, HCOONa, HCOOK, $Li_2C_2O_4$, $Na_2C_2O_4$, $K_2C_2O_4$, $CH_3COOLi$, $CH_3COONa$, $CH_3COOK$, $C_2H_5COOLi$, $LiOOC\text{-}CH_2\text{-}COOLi$.

lithium citrate, sodium citrate, potassium citrate, lithium tartarate, lithium salt of trimellitic acid, lithium salt of pyromellitic acid, etc.

Among these alkali metal compounds, chlorides are most effective in preventing the formation of ice. However, care should be taken in using salts of strong acids which are apt to produce rust on metallic substrates. Carbonates, silicates and acetates are next to chloride in effect of prevention of icing and are more suited because of the preventing action maintained for a prolonged period of time and less likelihood of producing rust. Among these alkali metal compounds, lithium compounds are superior in precluding icing to sodium compounds and potassium compounds, hence more adequate for use.

These alkali metal compounds are usable singly or in mixture. The compound is used in an amount of usually 0.2 to 30% by weight, preferably 0.5 to 10% by weight, based on the present composition. With less than 0.2% by weight of the compound, reduced effect of preventing icing results, whereas if the amount of the compound used in more than 30% by weight, the physical properties and durability of the coating are impaired and the susceptibility of the coating to icing is also increased.

In preparing the present composition, the organopolysiloxane resin and alkali metal compound are mixed by the usual method employing a steel-ball mill, pebble mill, attritor mill, etc. A suitable solvent is added in adapting the present composition to coating purpose. Usable are solvents which are able to dissolve the organopolysiloxane resin. A wide variety of solvents usually used in preparing coating compositions are used which include benzene, toluene, xylene, cyclohexane, hexane, heptane, octane and like linear or cyclic hydrocarbons, methylethyl ketone, methylisobutyl ketone, acetone and like ketone-type solvents, ethyl acetate, butyl acetate, and like ester-type solvents, methyl alcohol, ethyl alcohol, propyl alcohol and like alcohol-type solvents, etc. Water is employed as the solvent in preparing water-dispersible coating compositions. The solvent is used in an amount of usually 0 to 500 parts by weight, preferably 20 to 80 parts by weight, per 100 parts calculated as the combined amount of the components (A) and (B). The coating composition thus prepared is applied as a top coat over an under coat or applicable directly over the surface of materials such as metal, plastics, glass, wood, etc. The present composition is moldable into strips of film which are laminated over the surface of an object, and may contain, when required, a coloring pigment such as titanium oxide, carbon black, iron oxide, Phthalocyanine Blue, an extender pigment such as calcium carbonate, barium sulfate, talc, barita or a dye in an amount of up to 120 parts by weight per 100 parts calculated as the combined amount of the components (A) and (B). A surfactant and other additives such as silica may be incorporated in the present coating composition.

The present invention will be described in more detail with reference to examples in which parts and percentages are all by weight unless otherwise specified. Tests for susceptibility of the coating to icing were carried out in the following manner using a device shown in FIG. 1. The illustrated device includes a container 2 of foamed styrol with the interior covered with copper plates 1. In the container 2 was placed a stainless steel plate 3 (measuring 100×100×100 mm) coated with the present coating composition to form a coating 4. A terminal member 5 with a flat bottom of stainless steel was laid on top of the coating 4 to cover an area of 31.17 cm$^2$ such that water was interposed as a thin layer 6 5 to 10 μm in thickness, between the bottom of the terminal member 5 and the coating 4. The device thus arranged was left to stand in a freezer maintained at −20° to −30° C. for 5 to 72 hours. Thereafter the terminal member was moved upward in the freezer by an adherence tester 7 (product of Elcometer Ltd., U.K.) to measure an interfacial breaking strength (Kg/cm$^2$) in the interface between the ice and the coating by a measuring cylinder 9.

Indicated at 8 is a supporting member; at 10, a coil spring; and at 11, a rubber packing.

EXAMPLE 1

A 100 part quantity of additional polymerization-type organopolysiloxane resin (product of Toray Silicone K.K., Japan, available under SE-1821, 40% non-volatile ingredient) and 2 parts of lithium acetate were placed, together with alumina silicate beads 5 mm in diameter, in a Red Devil-type paint conditioner and were dispersed therein for 30 minutes. Then 10 parts of a platinum-type catalyst as a curing agent (product of Toray Silicone K.K., Japan, available under SE-1821 Cat) was added to the dispersion to prepare a coating composition. The coating composition thus prepared was applied by an applicator to the surface of a copper plate for icing tests which was then baked at 100° C. for 5 minutes. The coating formed thereby was 12 μm in thickness when dried. The coated plate was subjected to freezing at −29° C. for 16 hours and was tested by the method as described above for an adhesion of ice to the surface of the copper plate (hereinafter referred to as "icing strength").

For comparative purposes, tests for icing strength were further carried out under the same conditions as above by using (i) a coating composition prepared in the same manner as above except that the lithium acetate was not used (Comparison example 1-1); (ii) a coating composition prepared in the same manner as above with the exception of using barium sulfate in the same amount in place of the lithium acetate (Comparison example 1-2); and (iii) Teflon resin (polytetrafluoroethylene) film thermally adhered in thickness of 2 mm by a press to the surface of the copper plate (Comparison example 1-3). Table 1 given below shows the test results.

TABLE 1

|  | Example 1 | Comp. ex. 1-1 | Comp. ex. 1-2 | Comp. ex. 1-3 |
| --- | --- | --- | --- | --- |
| Icing strength (kg/cm$^2$) | 0 | 1.0 | 2.5 | 2.2 |

EXAMPLE 2

A 100 part quantity of additional polymerization-type organopolysiloxane resin (product of Toray Silicone K.K., Japan, available under SRX-211, 40% non-volatile ingredient, approximately above 300,000 in number average molecular weight) and 0.5 part of lithium chloride were dispersed in the same manner as in Example 1. Thereto was added 0.6 part of a platinum-type catalyst (product of Toray Silicone K.K., Japan, available under SRX-212 Cat) to prepare a coating composition. The coating composition thus obtained was applied in the same manner as in Example 1 to a copper plate of the same kind and the coated plate was heated at 150° C. for 3 minutes to form a coating 20 μm in thickness when dried. The coated plate was tested by the same method as described hereinbefore for icing strength after having been frozen at −25° C. for 44 hours.

For comparison, tests for icing strength were further conducted under the same conditions as Example 1 by using (i) a coating composition prepared in the same manner as in Example 2 except that the lithium chloride was not used (Comparison example 2-1); (ii) a coating composition prepared in the same manner as in Example 1 with the exception of using calcium chloride in the same amount in place of the lithium chloride (Comparison ex. 2-2); and (iii) Teflon resin film thermally adhered by a press to the surface of the copper plate to form a coating 2 mm in thickness (Comparison ex. 2-3). The test results are shown in Table 2 given below.

TABLE 2

|  | Example 2 | Comp. ex. 2-1 | Comp. ex. 2-2 | Comp. ex. 2-3 |
| --- | --- | --- | --- | --- |
| Icing strength (kg/cm$^2$) | 0 | 1.3 | 1.5 | 1.6 |

EXAMPLE 3

A 100 part quantity of condensation polymerization-type resin (product of Toray Silicone K.K., Japan, available under SE-9140, 40% non-volatile ingredient) and 4 parts of potassium carbonate were dispersed in the same manner as in Example 1 and the coating composition thus prepared was applied in the same manner as in Example 1. The coated plate was dried at room temperature for 48 hours to form a coating 7 μm when dried. The icing strength of the coated plate was measured after it was frozen at −20° C. for 5 hours.

For comparison, tests for icing strength were effected under the same conditions as in Example 1 by using a coating composition prepared in the same manner as in Example 3 with the exception of not using the potassium carbonate (Comparison example 3-1) and Teflon resin film thermally adhered by a press to the surface of the copper plate (Comparison example 3-2) to form a 2 mm-thick coating. The test results were indicated in Table 3.

TABLE 3

|  | Example 3 | Comp. ex. 3-1 | Comp. ex. 3-2 |
|---|---|---|---|
| Icing strength (kg/cm$^2$) | 0.3 | 0.7 | 0.8 |

EXAMPLE 4

A 100 part quantity of condensation polymerization-type organopolysiloxane resin (product of Toray Silicone K.K., available under PRX-305, 40% non-volatile ingredient, approximately over 300,000 in number average molecular weight) and 1.0 part of lithium citrate were dispersed in the same manner as in Example 1. The coating composition thus obtained was applied to a copper plate in the same manner as Example 1. The coated plate was left to stand at room temperature for 24 hours to form a dried coating 30 μm in thickness. The plate was frozen at −20° C. for 5 hours and tested for icing strength.

For comparison, two copper plates of the same kind as used in Example 1 were coated in the same manner as in Example 1 with a coating composition prepared in the same manner as in Example 1 with the exception of not using the lithium citrate (Comparison example 4-1) and Teflon resin film thermally adhered by a press in a 2 mm-thick layer to the surface of the copper plate (Comparison example 4-2), respectively. Then the plates were checked for icing strength with the results shown below in Table 4.

TABLE 4

|  | Example 4 | Comp. ex. 4-1 | Comp. ex. 4-2 |
|---|---|---|---|
| Icing strength (kg/cm$^2$) | 0 | 1.8 | 0.7 |

EXAMPLE 5

A 100 part quantity of condensation polymerization-type organopolysiloxane resin (product of Toray Silicone K.K., Japan, available under SH-237, 40% nonvolatile ingredient, approx. 17,000 in number average molecular weight), 2.5 parts of lithium oxalate and 40 parts of titanium dioxide were dispersed, applied and dried at 50° C. for 5 hours to form a coating having a thickness of 15 μm. After freezing at −26° C. for 22 hours, the coated plate was checked for icing strength.

For comparison, icing strength was measured under the same conditions as in Example 1 with respect to copper plates of the same kind as used in Example 1 which were coated with a coating composition prepared in the same manner as Example 1 but without using the lithium oxalate (Comparison example 5-1) and Teflon resin film thermally adhered by a press in a 2 mm-thick layer (Comparison example 5-2), respectively with the results shown in Table 5 below.

TABLE 5

|  | Example 5 | Comp. ex. 5-1 | Comp. ex. 5-2 |
|---|---|---|---|
| Icing strength (kg/cm$^2$) | 0 | 2.4 | 2.0 |

EXAMPLE 6

A 100 part quantity of an aqueous solution of condensation polymerization-type organopolysiloxane resin (product of Toray Silicone K.K., Japan, available under SE-1980, 45% non-volatile ingredient) and 1.2 parts of sodium chloride were dispersed, applied in the same manner as in Example 1 and allowed to stand at room temperature for 48 hours, and dried for 3 hours at 50° C. to form a coating 30 μm in thickness. The icing strength of the coated plate was measured after freezing at −20° C. for 5 hours.

For comparison, copper plates as used in Example 1 were covered with a coating composition prepared in the same manner as in Example 1 (Comparison example 6-1) with the exception of not using the sodium chloride and Teflon resin film thermally adhered by a press in a 2 mm-thick layer (Comparison example 6-2), respectively. The coated plates were checked for icing strength with the results indicated below in Table 6.

TABLE 6

|  | Example 6 | Comp. ex. 6-1 | Comp. ex. 6-2 |
|---|---|---|---|
| Icing strength (kg/cm$^2$) | 0.5 | below 3.5 | 0.8 |

EXAMPLE 7

A 100 part quantity of addition polymerization-type organopolysiloxane resin (product of Toray Silicone K.K., Japan, available under SH-95551 RTV, 100% non-volatile ingredient) and 10 parts of lithium carbonate were dispersed in the same manner as in Example 1. To the dispersion was added 10 parts of a platinum-type catalyst (which was the same type as used in Example 1) with stirring. The coating composition thus prepared was moled into a uniformly 2 mm-thick layer having a flat surface over a substrate plate for icing test. The layer was dried at ordinary temperature for 48 hours and frozen at −29° C. for 18 hours to measure icing strength.

For comparison, icing strength was measured under the same conditions as in Example 1 with respect to copper plates as used in Example 1 which were coated with a coating composition prepared in the same manner as in Example 1 with the exception of not emplying the lithium carbonate (Comparison example 7-1) and Teflon resin film thermally adhered by a press in a 2 mm-thick coating (Comparison ex. 7-2), respectively with the results shown in Table 7 below.

TABLE 7

|  | Example 7 | Comp. ex. 7-1 | Comp. ex. 7-2 |
|---|---|---|---|
| Icing strength (kg/cm$^2$) | 0 | 0.6 | 2.2 |

I claim:

1. A composition for use in preventing the formation of ice comprising:

(A) 70 to 99.8% by weight of organopolysiloxane resin comprising recurring structural units of the formula $$R_n Si(OR')_m O_{\frac{4-n-m}{2}}$$

wherein R represents hydrogen atom or monovalent organic group attached to the silicon atom by a carbon-to-silicon bond, R' represents hydrogen atom, $C_1$ to $C_{20}$ alkyl group, aryl group, oxime residue, n and m are each 0, 1, 2, or 3 and n plus m is an integer of 1–3, and (B) 0.2 to 30% by weight alkali metal compound represented by the formula $$M_a^\oplus X^\ominus$$

wherein M represents alkali metal selected from Li, Na and K, X represents inorganic or organic acid group or hydroxyl group and a is an integer of 1 to 4.

2. The composition according to claim 1 in which the alkali metal compound is at least one member selected from alkali metal salts of chloric acid, carbonic acid silicic acid and acetic acid.

3. The composition according to claim 1 in which the alkali metal compound is lithium salt of inorganic or organic acid.

* * * * *